March 29, 1927. 1,622,773
H. FAHNENSCHMIDT
SCREW CONNECTION FOR SIPHONS OR WASHBASINS, FOUNTAINS, AND THE LIKE
Filed June 4, 1925
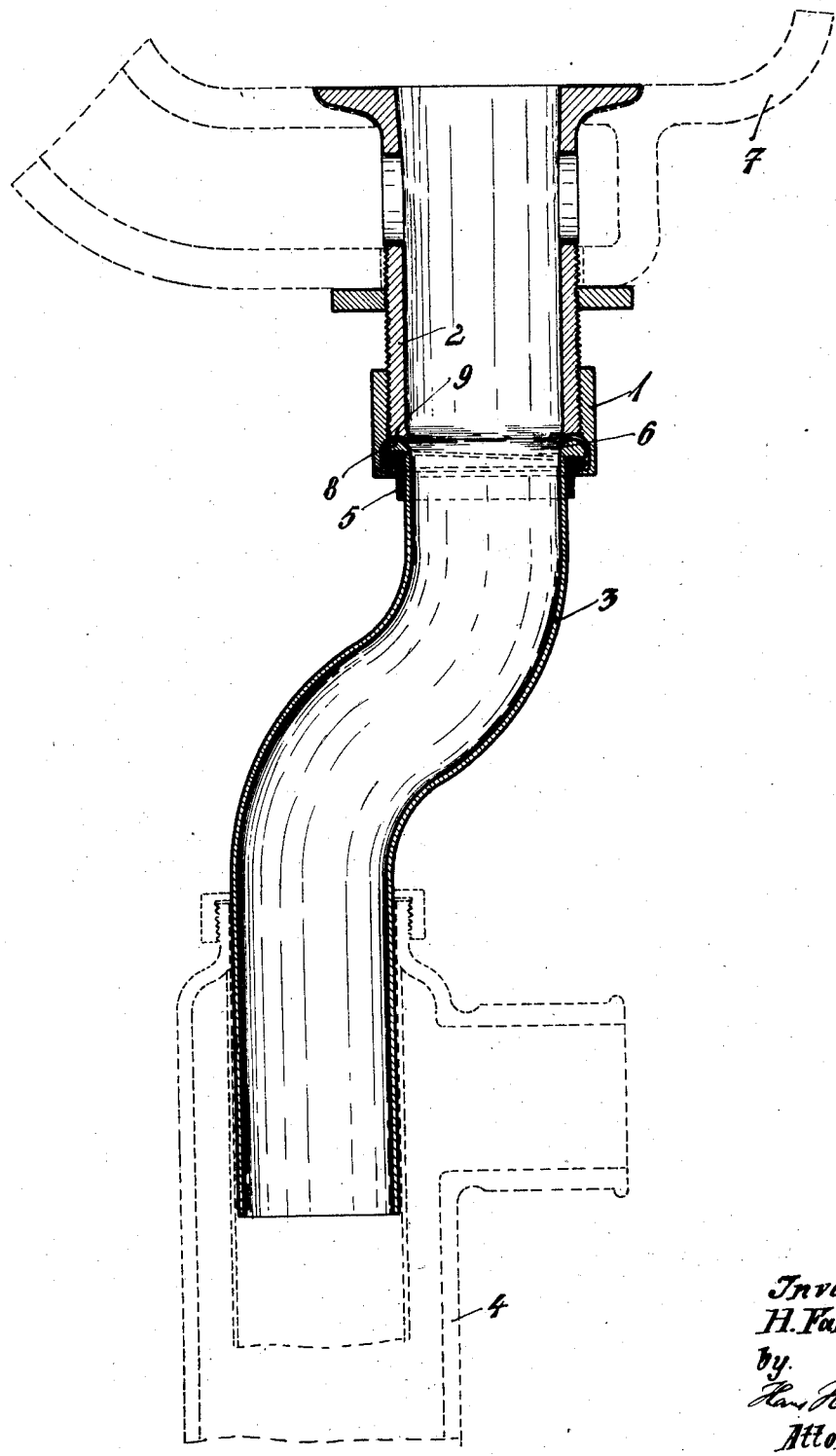
Inventor
H. Fahnenschmidt
by
Hans Hederich, P.D.
Attorney Patented Mar. 29, 1927.

1,622,773

UNITED STATES PATENT OFFICE.

HANS FAHNENSCHMIDT, OF CASSEL, GERMANY.

SCREW-CONNECTION FOR SIPHONS OF WASHBASINS, FOUNTAINS, AND THE LIKE.

Application filed June 4, 1925, Serial No. 34,997, and in Germany September 24, 1923.

This invention relates to a screwed connection for siphons in wash basins, fountains and the like which is of such construction that the outflow pipe leading to the siphon is adjustable, this being desirable on account of the irregularity of the basins of fire clay. While the commonly used siphons made from a rigid metal could not be vertically fixed on the basin when this basin is in a slanting position or when the joining faces are not straight, it is according to the invention, indifferent which position the tubular socket of the basin has as the siphon will be under any conditions built in perfectly vertically.

According to the invention this result is obtained by means of an insertion ring having on the top end a shoulder inclined to the perpendicular which is adjustable underneath the projecting flange of the outflow pipe said flange being bevelled on the lower surface and forming together with the lower end of the tubular socket a ball like connection, so that said insertion ring, the nut being loose, can be adjusted under said bevelled lower surface of the outflow pipe.

An embodiment of the invention is shown, by way of example, in the only figure of the accompanying drawing which shows the improved screwed joint in longitudinal section.

On an inwardly directed ring-shaped flange of the nut 1 designed for connecting the ball like end of the tubular socket 2 and the outflow pipe 3 leading to the siphon 4 an insertion ring 5 is mounted which has at the top end a shoulder inclined with regard to the perpendicular, said shoulder being adjustable, when the nut 1 is loose, under the projecting flange of the outflow pipe 3 said flange being bevelled accordingly and terminating as a kind of ball-member.

The outflow pipe 3 connected with the tubular socket 2 is consequently movable after the manner of a pendulum and adjustable to all sides. By the rotatable insertion ring 5 having an inclined shoulder and located under the ring-shaped bevelled connection piece 6 any inclined position of the casing of the siphon can be equalized. Consequently any tension to which the basin 7 would otherwise be submitted when the connection nut 1 is tightened is avoided and the combination of the ball like flange 8 of the outflow pipe 3 in the cavity 9 of the tubular socket 2 ensures a perfectly tight packing.

I claim:—

A screw-cap connection for pipes, of which one is to be adjustable relatively to the other, comprising, in combination with the connection-ends of said pipes, a flange pertaining to one of said ends and contacting at its tightening surface with the tightening end surface of the other pipe, and having an oblique bottom surface; a cap-nut screwed upon the end of said other pipe and having its inwardly directed flange located opposite said oblique bottom surface of the first-mentioned flange, and remote therefrom; and an annular member comprising a ring located in the space between the two flanges and having opposite the said oblique surface a corresponding oblique surface, and a tubular extension extending outwardly along the flanged pipe between it and the flange of the said screw-cap.

In testimony whereof I affix my signature.

HANS FAHNENSCHMIDT.